United States Patent [19]
Thompson

[11] 3,786,988
[45] Jan. 22, 1974

[54] CORRELATOR FOR AUTOMOBILE WASHING INSTALLATIONS
[75] Inventor: William H. Thompson, Mount Prospect, Ill.
[73] Assignee: Trans-Clean, Inc., Glenview, Ill.
[22] Filed: Feb. 25, 1972
[21] Appl. No.: 229,386

[52] U.S. Cl.................... 238/4, 104/172 B, 295/37
[51] Int. Cl............................................. B61b 13/12
[58] Field of Search ........ 104/172 B; 238/1, 2, 3, 6, 238/4; 295/1, 37; 214/38 BB

[56] References Cited
UNITED STATES PATENTS
| | | | |
|---|---|---|---|
| 3,199,783 | 8/1965 | Hurst | 238/4 |
| 106,635 | 8/1870 | Sturneyk | 295/37 |
| 3,511,187 | 5/1970 | Hanna | 104/172 B |
| 2,924,389 | 2/1960 | Anderson | 238/4 |
| 1,805,211 | 5/1931 | Geiger | 238/3 |
| 1,696,238 | 12/1928 | Isbell | 238/3 |

Primary Examiner—Robert G. Sheridan
Assistant Examiner—Richard A. Bertsch
Attorney, Agent, or Firm—Granger Cook, Jr.

[57] ABSTRACT

A correlator for properly aligning the front of a vehicle which is about to be washed in a conveyorized automatic auto laundry installation. A load-bearing plate is capable of lateral movement in two directions over a series of wheel assemblies which comprise no load-carrying bearings. The plate is returned to a null position after movement in either direction by a single, pre-loaded spring.

11 Claims, 6 Drawing Figures

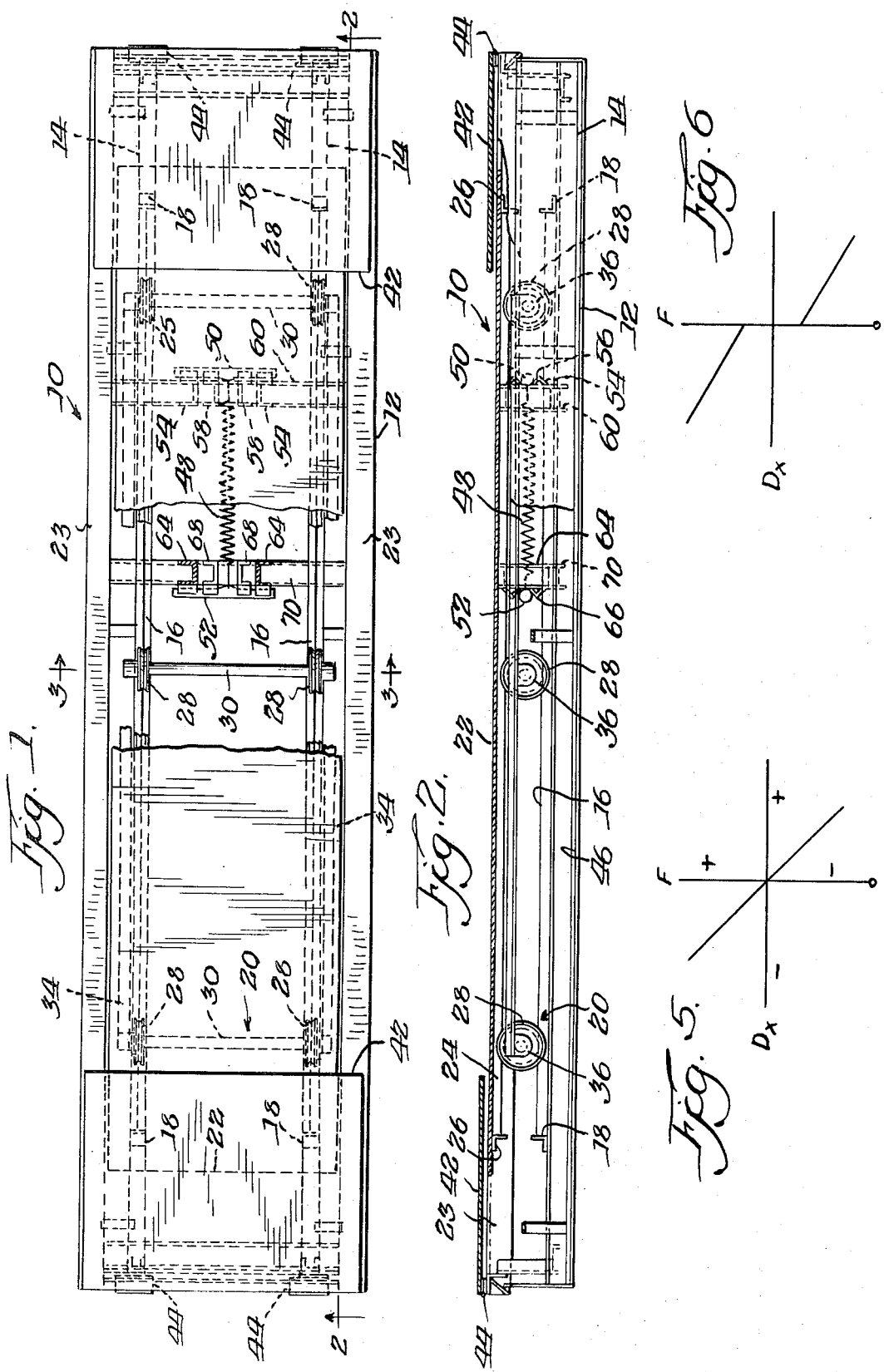

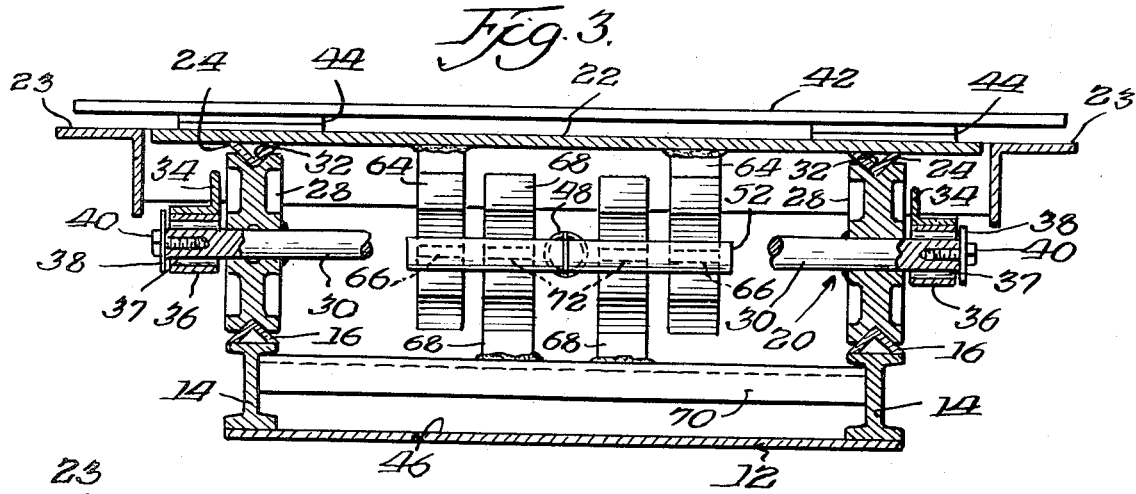
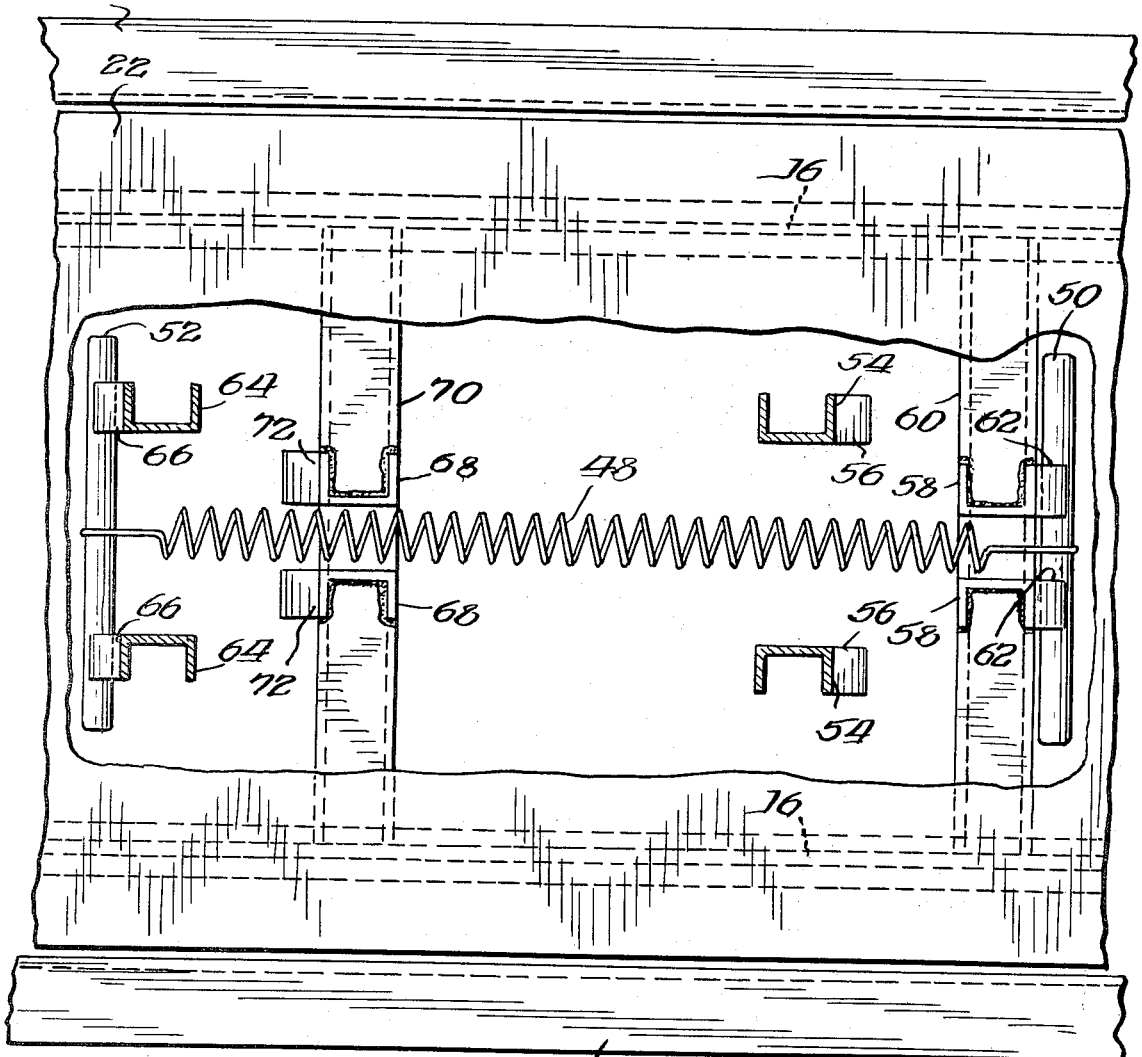

CORRELATOR FOR AUTOMOBILE WASHING INSTALLATIONS

The present invention relates generally to null balance load-shifting and aligning device, and more particularly to a shiftable load-bearing correlator for properly positioning a vehicle adjacent the entrance to an automatic vehicle laundry.

Conveyorized vehicle washing systems are in wide use today. In these installations, a vehicle is conveyed along a linear path through a series of stationary washing elements such as detergent application and scrubbing means, rinse means, wax application means, and drying means. A pair of guide rails or the like are normally positioned along the length of the floor of the washing facility for directing proper movement of the vehicle through the washing elements. Movable conveyor means adopted for engagement with one of the front wheels or the bumper of the vehicle provide the means for moving the vehicle along the guide rails.

Efficient and proper operation of a conveyorized washing facility requires that a vehicle approaching the washing bay be properly aligned for engagement with the conveyor means and associated guide rails. It has been observed that when vehicles enter the wash bay too far to the right or left of the guide rails, jamming occurs which causes a shutdown of the entire washing system. Also, misaligned vehicles may impact with elements of the washing apparatus, causing permanent damage thereto.

Broadly, it is an object of the present invention to provide correlator means adapted for use at the entrance to conveyorized vehicle washing systems for the purpose of properly indexing a vehicle to be washed in relation to the conveyor and guide rail means associated with the facility. Specifically, it is an object of the present invention to provide a null-balance shiftable platform device for moving a pair of vehicle wheels to the right or left to afford proper alignment of the vehicle wheels with the guide rails located on the floor of the washing facility.

It is a further object of the present invention to provide a shiftable correlator device for use in conjunction with a vehicle washing facility comprising a platform which is influenced towards a null-balance position by means of a positive, single, pre-loaded centering spring.

An additional object of the present invention is to provide a shiftable platform for laterally moving a vehicle at the entrance to a vehicle washing facility, wherein a large predetermined force is required to initiate movement of the platform off dead center.

Still another object of my invention is to provide a spring biased, null-balance shiftable platform comprising spring means which only expands a distance equal to the displacement of the platform in either lateral direction.

An additional object of the present invention is to provide a shiftable, load-bearing correlator device with support means having no load carrying bearings.

Still another object of the present invention is to provide a shiftable, load-bearing correlator device which needs no lubrication.

A further object of the present invention is to provide a shiftable, load-bearing correlator device designed for installation out of doors which is characterized by ease of maintenance and cleaning.

A load-shifting correlator demonstrating objects and advantages of the present invention includes a stationary base frame over which a series of free-axle wheel members support a top plate assembly which is laterally movable relative to the frame. The wheel assemblies are not attached to either the frame or the movable plate, and the need for load-carrying bearings is eliminated. A single pre-loaded spring assembly is releasably disposed between the frame and the movable plate to urge the plate to a null-balance position. Grooved blocks, some affixed to the frame and some affixed to the movable plate, hold the spring in place during lateral movement of the plate in either direction, and center the plate in a null-balance position regardless of the previous direction of movement. The pre-loading of the spring affords a positive centering force even while the movable plate is in a null position, thereby preventing unnecessary movement off center of the plate under small loads.

The above brief description, as well as further objects, features and advantages of my invention will be more appreciated by reference to the following detailed description of a preferred embodiment in accordance with the invention, when taken in conjunction with the accompanying drawings:

FIG. 1 is a top plan view of the load-bearing correlator of the present invention, with a portion of the movable plate removed to show the details of a wheel assembly and a portion of the spring assembly;

FIG. 2 is a side elevation view of the load-bearing correlator of the present invention taken along lines 2—2 in FIG. 1;

FIG. 3 is a section view of the subject correlator taken along lines 3—3 of FIG. 1;

FIG. 4 is a detail view of the spring assembly of the present invention, showing the position of the spring assembly when the load-bearing plate of FIG. 1 has moved to the left;

FIG. 5 is a diagramatic expression of the relation between applied force and lateral movement of a load-bearing plate in correlators using known null-balance systems; and FIG. 6 is a diagramatic expression of the relation between applied force and lateral movement of a load-bearing plate constructed in accordance with the present invention.

Reference is now made to the drawings, and in particular to FIGS. 1, 2 and 3 where an embodiment of a load-bearing correlator constructed in accordance with the present invention is generally designated 10. An elongated, trough-shaped frame 12 sits in and upon the foundation of the vehicle washing facility in which it is used. Disposed upon the base of frame 12 are a pair of track support elements 14, illustrated as a pair of I-beam members adhered to and extending along the length of frame 12. First track means 16 are fixed atop each track support element 14, and preferably comprise inverted steel angles held in place on the track support elements by means of angle brace members 18 which may be welded to track support elements 14 and each first track means 16.

A plurality of wheel assemblies 20 cooperate with first track means 16 to movably support load bearing plate means 22. Plate 22 comprises a flat element made of steel or the like, which, as best seen in FIG. 2, does not quite extend laterally to the ends of frame 12. This permits plate 22 to move laterally in either longitudinal direction (right or left) without extending beyond the limits of frame 12, as will be explained. The dimensions of plate means 22 are sufficient to provide a bearing surface sufficient to support the resultant load beneath the front wheels of a vehicle to be washed in an automatic vehicle washing device. A shelf portion 23 is provided on either side of frame 12 to allow the wheels of a vehicle to pass smoothly to and from plate member 22.

Attached to the underside of plate means 22, and extending substantially along the length thereof, are a second pair of track means 24 (FIG. 2) which are preferably welded to plate 22 and held longitudinally in place by angle brace members 26. Each wheel assembly 20 comprises a pair of grooved wheel means 28 on opposite ends of axles 30. The grooved portion 32 of wheel means 28 cooperate with first track means 16 and second track means 24 to support plate means 22 for movement upon frame 12. Each wheel means 28 is rigidly affixed to its respective axle 30 for movement therewith. It is readily apparent that as plate means 22 moves longitudinally within the frame 12, wheels 28 roll over the respective track means and plate 22 travels over the upper surfaces of wheel means 28 a distance equal to twice the distance traveled by axles 30 of wheel assemblies 20. It is apparent, therefore, that wheel means 28 require no load-carrying bearings at their respective juncture with axles 30 since the wheels do not rotate with respect to the axles. Further, since axles 30 are not attached to either plate means 22 or frame 12, no load-carrying bearings or lubrication are required.

Brace means are provided to maintain the longitudinal spacing between each wheel assembly 20 at a constant dimension while plate means 22 moves over wheels 28. Spacer bar means 34 are rigidly attached to a plurality of collar members 36 which in turn are rotatably mounted about the outer ends of axles 30 (FIG. 4). Nylon bushings 37 or the like are provided inside each collar member 36 to enable each axle 30 to rotate substantially without friction relative to its corresponding collar member 36. Two spacer bar means 34 are provided, one on each side of the wheel assemblies 20. Washer means 38 are removably affixed to the ends of axles 30 by means of bolts 40 to hold collars 36 and bushings 37 in frictional engagement with axles 30. By removing bolt 40 and washer 38, each wheel assembly may be disengaged from its associated spacer bar 34 and wheel 28 may be removed for ease of maintenance.

The ends of load-bearing plate means 22 are partially covered by top plate cover means 42 hinged at 44 to each of the ends of frame 12. By pivoting each top plate cover 42 upward about its associated hinge 44 to a vertical position, plate 22 may be lifted and removed from frame 12 to permit access to the internal portions of correlator 10, allowing proper maintenance and cleaning. The bottom of frame 14 is trough-shaped, as indicated previously, providing a catch basin 46 (FIG. 2) to trap oil and dirt. A drain is also provided (not shown) to remove any oil or foreign material trapped in basin 46.

An important feature of the present invention is the novel means by which a single, pre-loaded spring is used to return plate means 22 to a neutral, or null-balance position after the plate has been moved to the right or left under the influence of the lateral movement of the front wheels of a vehicle. With particular reference to FIGS. 1, 2, 3 and 4, a spring 48 is extended, under tension, between two spring rod members 50 and 52. Adjacent rod 50, a first pair of spring rod retaining blocks 54 are rigidly attached to the under side of load-bearing plate means 22. Each retaining block 54 comprises a V-groove 56 therein for engaging and holding spring rod member 50 (FIG. 2). V-grooves 56 face outwardly in a direction away from the longitudinal extension of spring 48 for purposes to be explained.

Located laterally between spring rod retaining blocks 54, and also adjacent spring rod members 50, a second pair of spring rod retaining blocks 58 are firmly secured to a beam 60 of frame 12. Each retaining block 58 also comprises a V-groove 62 (FIG. 4) for engaging and holding spring rod member 50, which V-grooves 62 also face outwardly in a direction opposite the longitudinal extension of spring 48 from rod 50. When the correlator 10 is in a static position, V-grooves 56 and 62 of retaining blocks 54 and 58 engage rod 50 and hold the rod against the force of tension in spring 48.

A similar structure is disposed at the opposite end of spring 48, where spring rod member 52 engages the other end of spring 48. Adjacent rod 52, a third pair of spring rod retaining blocks 64 are rigidly attached to the underside of load bearing plate means 22 at a predetermined longitudinal distance from blocks 54. Each retaining block 64 comprises a V-groove 66 therein for engaging and holding spring rod member 52 (FIG. 2). V-grooves 66 face outwardly in a direction away from the longitudinal extension of spring 48 for purposes to be explained.

Located laterally between spring rod retaining blocks 64, and also adjacent spring rod member 52, a fourth pair of spring rod retaining blocks 68 are firmly secured to a beam member 70 of frame 12. Each retaining block 68 also comprises a V-groove 72 (FIG. 4) for engaging and holding spring rod member 52, which V-grooves 72 also face outwardly in a direction opposite the longitudinal extension of spring 48 from rod 52. When the correlator 10 is in a static position, V-grooves 66 and 72 of retaining blocks 64 and 68 engage rod 52 and hold the rod against the force of tension in spring 48.

The characteristics of spring 48 are dependant upon the natural and pre-loaded length of the spring, plus the amount of force required to return plate 22 to a neutral position after properly indexing a vehicle at the entrance to a vehicle washing installation, as will be explained. Typically, a spring having an unloaded length of 19 inches may be used between spring rod members 50 and 52 which are held at a distance of 21 1/2 inches from each other by spring rod retaining blocks 54,58,64 and 68 when the load bearing plate is in its neutral position.

In operation, the correlator 10 is placed in the foundation of a vehicle washing facility adjacent and across the entrance to a conveyor unit which is designed to engage a portion of a vehicle and move the vehicle through the washing facility. When properly placed, the load-bearing plate 22 and shelf portion 23 of frame 12 are flush with the ground level of the washing facility. The correlator unit 10 is also disposed adjacent a pair of guide rails on the floor of the washing facility which engage one of the tires of the vehicle and force the vehicle to shift to the right or left for proper alignment with the conveyor unit while the tires are resting upon the upper surface of load-bearing plate 22.

For purposes of explanation, it will be assumed that the front tires of a vehicle are resting atop load-bearing plate 22 as seen in FIG. 2, and that the guide rails of the conveyor unit are forcing the tires to the left for proper alignment of the vehicle. The weight of the vehicle acting through frictional contact between the tires and plate 22 exerts a force driving plate 22 to the left, as viewed in FIGS. 1, 2 and 4.

As load-bearing plate 22 moves to the left, V-grooves 66 of the third pair of spring rod retaining blocks 64, which blocks are affixed to the underside of plate 22, engage spring rod member 52 and move the rod member to the left (FIG. 4). This forces rod member 52 out of V-grooves 72 in the fourth pair of spring rod retaining blocks 68, the latter which are secured to beam 70 of frame 12 and remain stationary. Simultaneously, the first pair of spring rod retaining blocks 54, also affixed to the underside of leftward moving plate 22, move to the left. However, spring rod member 50 is retained in V-grooves 62 of the second pair of spring rod retaining blocks, which are secured to beam 60 of frame 12 and remain stationary. V-grooves 56 of spring rod retaining blocks 54 become disengaged with spring rod member 50 as plate 22 moves to the left.

As spring rod member 52 moves to the left and spring rod member 50 remains stationary, spring 48 expands and stores kinetic energy (FIG. 4). This kinetic energy produces a force which acts on the third pair of spring rod retaining blocks 64 and tends to return plate 22 to its neutral or null position (FIG. 1). When the vehicle approaching the washing facility has been engaged by the conveyor and proceeds forward, the tires move off of load-bearing plate 22 and the force produced by the kinetic energy in spring 48 returns plate 22 to the right to its neutral position, whereby spring rod member 52 is again engaged by V-grooves 66 of spring rod retaining blocks 64 and by V-grooves 72 of spring rod retaining blocks 68.

If the vehicle to be washed is located too far to the left of the conveyor unit as it approaches the washing facility, and it is desired to move the vehicle to the right for proper alignment, the correlator device 10 of the present invention operates inversely to the procedure described hereinabove. When load-bearing plate 22 is forced to the right, the first pair of spring rod retaining blocks 54 move to the right and V-grooves 56 engage spring rod member 50 and move the spring rod member to the right. As it moves, spring rod member 50 becomes dislodged from V-grooves 62 in stationary spring rod retaining blocks 58. At the opposite end of spring 48, V-grooves 72 of the fourth pair of spring rod retaining blocks 68 hold spring rod member 52 stationary as the third pair of spring rod retaining blocks 64, which are affixed to the under-side of plate 22, proceeds to the right. Spring 48 is now expanded to the right, and kinetic energy is stored in the spring in proportion to the distance spring 48 has expanded. The stored kinetic energy prooduces a force which returns load-bearing plate 22 to the left and its neutral position when the tires of the vehicle have advanced from the surface of load-bearing plate 22.

As load-bearing plate 22 moves to the right or left, it is supported by wheel means 28 which roll along first track means 16. As wheel means 28 move under the influence of plate 22, axles 30 of wheel assemblies 20 also move since the axles are rigidly secured to the hubs of their respective wheels 28. With the construction provided, there is no need for load-carrying bearings between the wheels 28 and their associated axles 30, and no lubrication of the wheels 28 about their central axis is required.

As wheels 28 repeatedly move along first track means 16 throughout continued operation of correlator 10, a tendency exists for wheel assemblies 20 to move or creep towards one another. This would produce an imbalance in the load-bearing reaction forces which are required for proper functioning of the correlator, and means are provided to retain wheel assemblies 20 at a constant distance apart. Spacer bar means 34 are attached by means of collars 36 and bushings 37 to both sides of axles 30 of wheel assemblies 20 to maintain a constant distance between each wheel assembly. Bolts 40 and washers 38 are removable to facilitate replacement of bushings 37 if they wear out.

Another novel feature of the present invention results from the fact that spring 48 is pre-loaded by being installed under a tensive force when load-bearing plate 22 is in its neutral position. The effect of this pre-loading of spring 48 can best be described with reference to FIGS. 5 and 6. FIG. 5 is a force diagram plotting the relation between translational force applied to plate 22 (F) and the distance plate 22 moves ($D_x$) in response to such force in previous correlator devices, which normally use a two-spring assembly to force a mass to return to a neutral position. From FIG. 5, it is apparent that even a small force applied to the load-bearing plate in previous devices will cause slight translational movement. In other words, a person merely walking across the prior art correlator could start the bearing plate in motion. This is not only dangerous to personnel working in the washing installation, but it causes excess wear on moving parts of the correlator and shortens the life of the springs by subjecting them to unnecessary contraction and expansion.

In the present correlator, however, this disadvantage is eliminated. By using only a single, pre-loaded, spring, a substantial force is required to move load-bearing plate 22 even slightly from dead center. This is diagramatically expressed in FIG. 6, which indicates that there is no movement of plate 22 ($D_x$) whatsoever, until a certain force level is reached, whereby then, and only then, is plate 22 able to move from its neutral position.

Maximum translational movement of load-bearing plate 22 to both the left and the right is always available as a result of the positive centering force provided by the pre-loading system of spring 48. In many of the devices presently being used, since the centering force near the null position is extremely small (FIG. 5), an increase in friction will cause the load-bearing plate 22 to stop its translational motion in a position off center where the translational friction force is equal to the available spring force. Translational motion of the load-bearing plate 22 in that direction is then reduced and the effectiveness of the correlator 10 diminished.

Safer operation of the correlator 10 results from the use of the single centering spring 48. In present two-spring devices, the springs, through their opposition, tend to bring load-bearing plate 22 to the center or null position. In normal usage, the effects of motion and fatigue can cause these springs to fail by breaking. When this occurs, the remaining effective spring causes the load-bearing plate 22 to make a strong translational movement to one of its extreme positions. If an automobile or person is on the load-bearing plate 22 at this moment, severe damage or personal injury may result. Further, the load-bearing plate 22 is rigidly held in this fully displaced position by the remaining spring so that its effectiveness as a correlator is lost.

In the present invention, if the single spring 48 fails, there is no unbalanced force present causing a strong and dangerous translational movement of plate 22. Further, the load-bearing plate 22 is still free to make translational movement so that it can, with manual nulling, continue to operate as an effective correlator until repairs to the spring 48 can be made.

Ease of maintenance is provided by merely pivoting each top plate cover means 42 upward about its respective hinge 44, and lifting load-bearing plate 22 upward and slightly longitudinally to the right or left, as viewed in FIG. 1 The longitudinal movement dislodges the spring rod members 50 and 52 from spring rod retaining blocks 54 and 64, and allows plate 22 to be lifted upward and free of frame 12. By removing plate 22, the entire correlator structure in frame 12 is exposed for ease of access.

The foregoing description of the invention is explanatory only, and changes in the details of the illustrated construction may be made by those skilled in the art, within the scope of the invention, without departing from the spirit of the invention. While the load-bearing correlator of the present invention has been described and illustrated in association with a vehicle washing installation, it is apparent that the principles and structure of the subject correlator may be used in any environment where it is required to efficiently provide support for a movable or shifting load.

I claim:

1. A load-bearing device permitting movement of a load supported by said device comprising:
   frame means;
   load-bearing plate means;
   wheel assembly means disposed between said frame means and said load-bearing plate means and adapted for supporting said load-bearing plate means for movement between a first neutral position and a second position;
   spring means operably connected between said load-bearing plate means and said frame means adapted to provide a force urging said load-bearing plate means to said neutral position when said load-bearing plate means is in said second position,
   first and second spring rod members attached to the ends of said spring means;
   first spring rod retaining blocks affixed to said load-bearing plate for releasably engaging said first spring rod member;
   second spring rod retaining blocks affixed to said frame for releasably engaging said first spring rod member;
   third spring rod retaining blocks affixed to said load-bearing plate and spacially disposed relative to said first spring rod retaining blocks for releasably engaging said second spring rod member; and
   fourth spring rod retaining blocks affixed to said frame and spacially disposed relative to said second spring rod retaining blocks for releasably engaging said second spring rod member.

2. The load-bearing device of claim 1 including:
   aligned track means disposed on said frame and said load-bearing plate;
   wheel means associated with said wheel assembly means for tangential engagement with said track means, whereby movement of said load-bearing plate causes said wheel means to roll along said track means.

3. The load-bearing device of claim 2 wherein said wheel assembly means includes axles rigidly affixed to the hubs of associated wheel means.

4. The load-bearing device of claim 1 including:
   a plurality of wheel assembly means spacially disposed along the length of said load-bearing plate means, and
   spacer bar means operably connected to said plurality of wheel assembly means and adapted to maintain a predetermined distance between said wheel assembly means as said load-bearing plate moves over said wheel assembly means.

5. The load-bearing device of claim 1 wherein said spring means is extended between said first and second spring rod members under a predetermined load.

6. The load-bearing device of claim 1 wherein each of said spring rod retaining blocks includes V-groove means for engagement with its respective spring rod member.

7. The load-bearing device of claim 1 wherein upon movement of said load-bearing plate means from said neutral position to said second position, said first spring rod retaining blocks engage said first spring rod and expand said spring means by moving said first spring rod in a direction away from said second spring rod, which said second spring rod is simultaneously held in a fixed position by said fourth spring rod retaining blocks.

8. The load-bearing device of claim 7 wherein said first and second spring rod means are released from engagement with said second and third spring rod retaining blocks respectively upon movement of said load-bearing plate means from said neutral to said second position.

9. In a vehicle washing apparatus of the type having conveyor means for moving an automobile to be washed through a plurality of washing devices and guide means adapted to engage one of the front tires of said vehicle for laterally shifting said tires for proper alignment of said vehicle with said conveyor means as said vehicle advances toward said conveyor means, the improvement comprising a load-bearing device disposed adjacent said guide means at the entrance of said conveyor means and adapted to movably support said tires of said vehicle as said tires and said vehicle are laterally shifted under the influence of said guide means, said load-bearing device including,
   frame means;
   load-bearing plate means;
   wheel assembly means disposed between said frame and said load-bearing means and adapted for supporting said load-bearing plate means for movement between a first neutral position and a second position when said tire is laterally shifted under the influence of said guide means;
   spring means operably connected between said load-bearing plate means and said frame means and adapted to provide a force urging said load-bearing plate means to said neutral position when said load-bearing plate means is in said second position;

first and second spring rod members attached to the ends of said spring means;

first spring rod retaining blocks affixed to said load-bearing plate for releasably engaging said first spring rod member;

second spring rod retaining blocks affixed to said frame for releasably engaging said first spring rod member;

third spring rod retaining blocks affixed to said load-bearing plate and spacially disposed relative to said first spring rod retaining blocks for releasably engaging said second spring rod member; and fourth spring rod retaining blocks affixed to said frame and spacially disposed relative to said second spring rod retaining blocks for releasably engaging said second spring rod member.

10. The vehicle washing apparatus of claim 9 wherein said load-bearing device includes plurality of wheel assembly means and spacer bar means operably connected to said plurality of wheel assembly means and adapted to maintain a predetermined distance between said wheel assembly means as the tires of said vehicle moves said load-bearing plate means over said wheel assembly means.

11. The vehicle washing apparatus of claim 9 wherein said spring means is extended between said first and second spring rod members under a predetermined load.

* * * * *